(12) United States Patent
Currie

(10) Patent No.: US 7,815,207 B2
(45) Date of Patent: Oct. 19, 2010

(54) REAR WHEEL SUSPENSION SYSTEM FOR A TWO-WHEELED VEHICLE

(76) Inventor: Christopher S. Currie, P.O. Box 60, Route 30, Laughlintown, PA (US) 15655

( * ) Notice: Subject to any disclaimer, the term of this patent is extended or adjusted under 35 U.S.C. 154(b) by 175 days.

(21) Appl. No.: 12/163,488

(22) Filed: Jun. 27, 2008

(65) Prior Publication Data
US 2009/0001686 A1 Jan. 1, 2009

Related U.S. Application Data

(60) Provisional application No. 60/946,822, filed on Jun. 28, 2007.

(51) Int. Cl.
B62K 19/00 (2006.01)
(52) U.S. Cl. .................. 280/284; 280/285; 280/286
(58) Field of Classification Search ............... 280/284, 280/285, 286
See application file for complete search history.

(56) References Cited

U.S. PATENT DOCUMENTS

| | | | |
|---|---|---|---|
| 3,917,313 A | 11/1975 | Smith et al. | |
| 3,974,892 A | 8/1976 | Bolger | |
| 3,982,770 A | 9/1976 | Satoh et al. | |
| 4,505,492 A | 3/1985 | Tsunoda | |
| 4,582,343 A | 4/1986 | Waugh | |
| 4,789,174 A * | 12/1988 | Lawwill | 280/284 |
| 5,121,937 A | 6/1992 | Lawwill | |
| 5,244,224 A | 9/1993 | Busby | |
| 5,306,036 A | 4/1994 | Busby | |
| 5,354,085 A | 10/1994 | Gally | |
| 5,409,249 A | 4/1995 | Busby | |
| 5,441,292 A | 8/1995 | Busby | |
| 5,452,910 A | 9/1995 | Harris | |
| 5,509,679 A | 4/1996 | Leitner | |
| 5,553,881 A | 9/1996 | Klassen et al. | |
| 5,611,557 A | 3/1997 | Farris et al. | |
| 5,628,524 A | 5/1997 | Klassen et al. | |
| 5,678,837 A | 10/1997 | Leitner | |
| 5,725,227 A | 3/1998 | Mayer | |
| 5,791,674 A * | 8/1998 | D'Aluisio et al. | 280/284 |
| 5,899,480 A | 5/1999 | Leitner | |
| 5,921,572 A | 7/1999 | Bard et al. | |
| 5,957,473 A | 9/1999 | Lawwill | |
| 6,056,307 A | 5/2000 | Busby et al. | |
| 6,073,950 A | 6/2000 | Busby | |
| 6,099,010 A | 8/2000 | Busby | |
| 6,102,421 A | 8/2000 | Lawwill et al. | |
| 6,109,636 A | 8/2000 | Klein et al. | |
| 6,131,934 A | 10/2000 | Sinclair | |

(Continued)

Primary Examiner—Lesley Morris
Assistant Examiner—Marlon A Arce
(74) Attorney, Agent, or Firm—Eckert Seamans Cherin & Mellott, LLC; Carol A. Marmo, Esq.

(57) ABSTRACT

A rear wheel suspension system for a two-wheeled vehicle is provided. The suspension system includes a rear frame pivotally connected to a main frame by at least an upper linkage and a lower linkage. The linkages are positioned such that the pivotal connection between the rear frame and the lower linkage is forward of the pivotal connection between the main frame and the lower linkage. Further, the rear wheel suspension system includes a biasing member such as a spring or shock absorber which allows the suspension to absorb impacts resulting from obstacles or irregularities in the surface of a terrain.

16 Claims, 11 Drawing Sheets

U.S. PATENT DOCUMENTS

| | | |
|---|---|---|
| 6,161,858 A | 12/2000 | Tseng |
| 6,164,676 A | 12/2000 | Wilcox |
| 6,199,886 B1 | 3/2001 | Guenther |
| 6,203,042 B1 | 3/2001 | Wilcox |
| 6,206,397 B1 | 3/2001 | Klasson et al. |
| 6,283,487 B1 | 9/2001 | Torre |
| 6,378,885 B1 | 4/2002 | Ellsworth et al. |
| 6,386,568 B1 | 5/2002 | Tribotte |
| 6,450,521 B1 | 9/2002 | Turner |
| 6,471,230 B2 | 10/2002 | Ellsworth et al. |
| 6,581,711 B1 * | 6/2003 | Tuluie ................ 180/227 |
| 6,595,538 B2 | 7/2003 | Ellsworth et al. |
| 6,755,432 B2 | 6/2004 | Muser |
| 6,843,494 B2 | 1/2005 | Lam |
| 6,854,753 B2 | 2/2005 | Turner |
| 6,880,847 B2 | 4/2005 | Chamberlain et al. |
| 6,886,846 B2 | 5/2005 | Carroll |
| 6,926,298 B2 | 8/2005 | Ellsworth et al. |
| 6,969,081 B2 | 11/2005 | Whyte |
| 7,048,292 B2 | 5/2006 | Weagle |
| 7,066,481 B1 | 6/2006 | Soucek |
| RE39,159 E * | 7/2006 | Klassen et al. ............. 280/284 |
| 7,100,930 B2 | 9/2006 | Saiki |
| 7,104,562 B2 | 9/2006 | Schmider et al. |
| 7,216,883 B2 | 5/2007 | O'Connor |
| 7,240,912 B2 | 7/2007 | Whyte |
| 7,296,815 B2 | 11/2007 | Ellsworth et al. |
| 7,350,797 B2 | 4/2008 | Carroll |
| 7,566,066 B2 * | 7/2009 | Chang et al. ............... 280/284 |
| 2005/0067806 A1 | 3/2005 | Weagle |
| 2005/0067810 A1 | 3/2005 | Weagle |
| 2006/0181053 A1* | 8/2006 | Huang et al. ............... 280/284 |
| 2007/0108725 A1* | 5/2007 | Graney ..................... 280/284 |
| 2008/0054595 A1* | 3/2008 | Lu ........................... 280/284 |

* cited by examiner

REAR WHEEL SUSPENSION SYSTEM FOR A TWO-WHEELED VEHICLE

CROSS REFERENCE TO RELATED APPLICATIONS

This application claims priority to Provisional Application Ser. No. 60/946,822, filed Jun. 28, 2007.

FIELD OF THE INVENTION

The invention relates generally to a rear wheel suspension system. The suspension system is particularly useful for a two-wheeled vehicle such as but not limited to a bicycle or mountain bike.

BACKGROUND INFORMATION

A rear wheel suspension system coupled to a main frame of a two-wheeled vehicle such as a bicycle or mountain bike is generally known in the art. For example, a conventional structure may include a main frame connected to a rear frame whereby the rear frame carries a rear wheel; a biasing member such as a shock absorber connected to the main frame and/or the rear frame, the biasing member being operable to dampen shocks due to deflections of the rear wheel.

In certain of the rear wheel suspension systems in the prior art, the motion used to pedal a two-wheeled vehicle can cause unwanted activation of the suspension system. As a result, energy expended to pedal may not be fully utilized to move the vehicle.

Thus, there is room for improvement in rear wheel suspension systems for two-wheeled vehicles. For example, it would be desirable for the motion to pedal the vehicle to be isolated from the motion of the suspension system, such that unwanted movement of the suspension system can be minimized or precluded while the vehicle is being pedaled and meanwhile the suspension system being operable to absorb impacts resulting from irregularities in the surface of the terrain.

SUMMARY OF THE INVENTION

In an aspect of the present invention, a rear wheel suspension system for a two-wheeled vehicle is provided. The vehicle includes a main frame. The rear wheel suspension system includes a rear frame. The rear frame is pivotally connected to an upper linkage and a lower linkage. The rear frame is connected to the lower linkage by a first lower pivot member. The lower linkage includes a first lower pivot member which connects the rear frame to the lower linkage; and a second lower pivot member which connects the main frame to the lower linkage. The suspension system also includes a rear wheel coupled to the rear frame, and a biasing member. The biasing member is connected to at least two members selected from the group consisting of the main frame, rear frame, upper linkage and lower linkage. The biasing member is structured to compress in response to a force applied to the rear wheel. The main frame is pivotally connected to the lower linkage by a second lower pivot member. The first and second lower pivot members are positioned such that the first lower pivot member is positioned forward of the second lower pivot member.

In another aspect of the invention, the rear frame is pivotally connected to the upper linkage by a first upper pivot member. The main frame is connected to the upper linkage by a second upper pivot member. The first and second upper pivot members are positioned such that the first upper pivot member is positioned forward of the second upper pivot member.

In another aspect of the invention, the first upper pivot member is positioned forward of the second lower pivot member.

In another aspect of the invention, the upper linkage and the lower linkage are structured to move in one direction, i.e., the same direction, in response to compression of the biasing member.

DETAILED DESCRIPTION OF THE PREFERRED EMBODIMENTS

For purposes of the description hereinafter, the terms "upper", "lower", "vertical", "horizontal", "top", "bottom", "forward", "behind", "rear", "front" and derivatives thereof shall relate to the invention as it is oriented in the Figures or as it is oriented when the rear wheel suspension system is coupled to a two-wheeled vehicle that is stationary or moving along a horizontal surface. However, it is to be understood that the invention may assume various alternative configurations when the invention is moved about or the invention, for example, is coupled to a two-wheeled vehicle that is moving along a non-horizontal surface. It is also to be understood that the specific elements illustrated in the Figures and described in the following specification are simply exemplary embodiments of the invention. Therefore, specific dimensions, orientations and other physical characteristics related to the embodiments disclosed herein are not to be considered limiting.

As used herein, the statement that two or more parts are "attached", "connected", "coupled", or "engaged" together shall mean that the parts are joined together either directly or joined through one or more intermediate parts.

As shown in the Figures, the invention is related to a rear wheel suspension system for a two-wheeled vehicle. The vehicle includes a main frame and a rear frame. The main frame and rear frame are each coupled to an upper linkage and a lower linkage. The rear frame connection to the lower linkage is positioned forward of the main frame connection to the lower linkage. The rear frame connection to the upper linkage is positioned forward of the main frame connection to the upper linkage. The main frame is also coupled to a front wheel and the rear frame is also coupled to a rear wheel.

Figure 1:
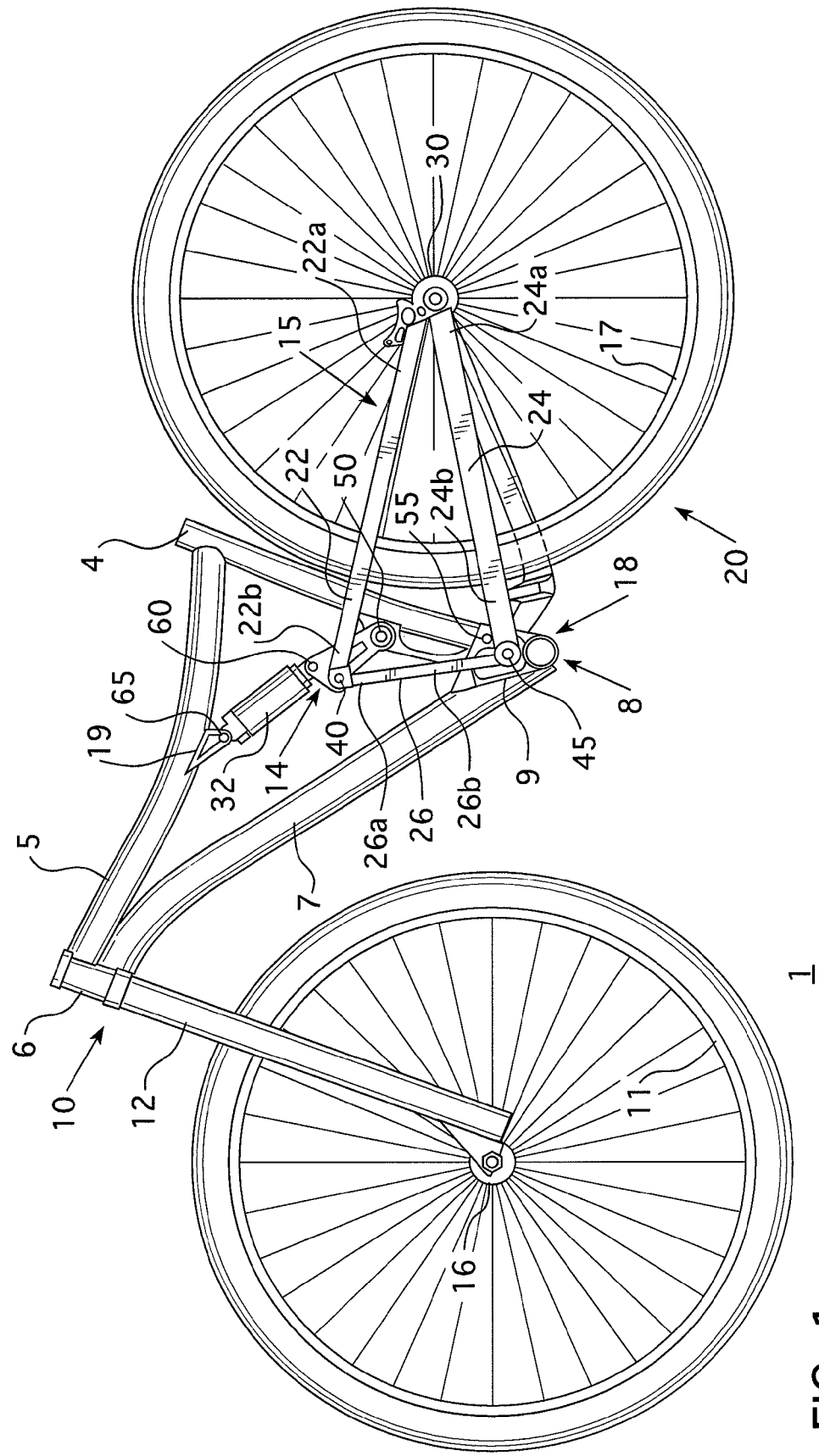
FIG. 1 is a diagram of an embodiment of the present invention showing a two-wheeled bike wherein the biasing member of the rear wheel suspension system is fully compressed.

The main frame and rear frame can be directly coupled to each other or indirectly coupled to each other through various coupling members FIG. 1 shows an embodiment of the present invention for a two-wheeled vehicle 1 such as a bicycle or mountain bike. The front portion of vehicle 1 is a relatively conventional structure including a fork 12, front wheel 11 and main frame 10. The rear portion of vehicle 1 includes a rear wheel suspension system 20.

Main frame 10 includes four tubes: the seat tube 4, the top cross bar 5, the head tube 6 and the diagonal tube 7. Bottom bracket 8 is mounted at the bottom end of the seat tube 4 where seat tube 4 intersects diagonal tube 7. Bottom bracket 8 houses a pedal assembly (pedals not shown). To the head tube 6 is mounted fork 12. Fork 12 is structured to include two prongs (one of which is shown in FIG. 1). The prongs being connected horizontally by front axle 16 such that front wheel 11 is positioned therebetween. The fork 12 may be a rigid structure (as shown in FIG. 1) or it can be a suspension structure (not shown) such that fork 12 includes its own biasing member to absorb impacts due to surface irregularities.

Main frame 10 is connected to upper linkage 14 by a second upper pivot member 50. The second upper pivot member 50 is coupled to flange 46 which extends from seat tube 4 of main frame 10. Main frame 10 is also connected to lower linkage 18 by second lower pivot member 55. The second lower pivot member 55 is coupled to housing 9.

Rear frame 15 is connected to the rear wheel 17. Rear frame 15 includes two subassemblies, one of which is visible in FIG. 1. The subassemblies being disposed on either side of main frame 10 and connected to each other by pivot connections as described below. Rear frame 15 is structured to form a relatively triangular configuration. Rear frame 15 includes three tubes: a swing arm 22, a lower arm 24 and a vertical arm 26. The rear portion 22a of swing arm 22 and the rear portion 24a of lower arm 24 are connected by a rear axle member 30. Rear axle member 30 extends horizontally between the two subassemblies of rear frame 15. Rear wheel 17 is coupled to rear axle 30 and is positioned between the two subassemblies of rear frame 15. The front portion 22b of swing arm 22 and the top portion 26a of vertical arm 26 are connected by first upper pivot member 40 to upper linkage 14. The front portion 24b of lower arm 24 and the bottom portion 26b of vertical arm 26 are connected by first lower pivot member 45 to lower linkage 18.

Figure 2:
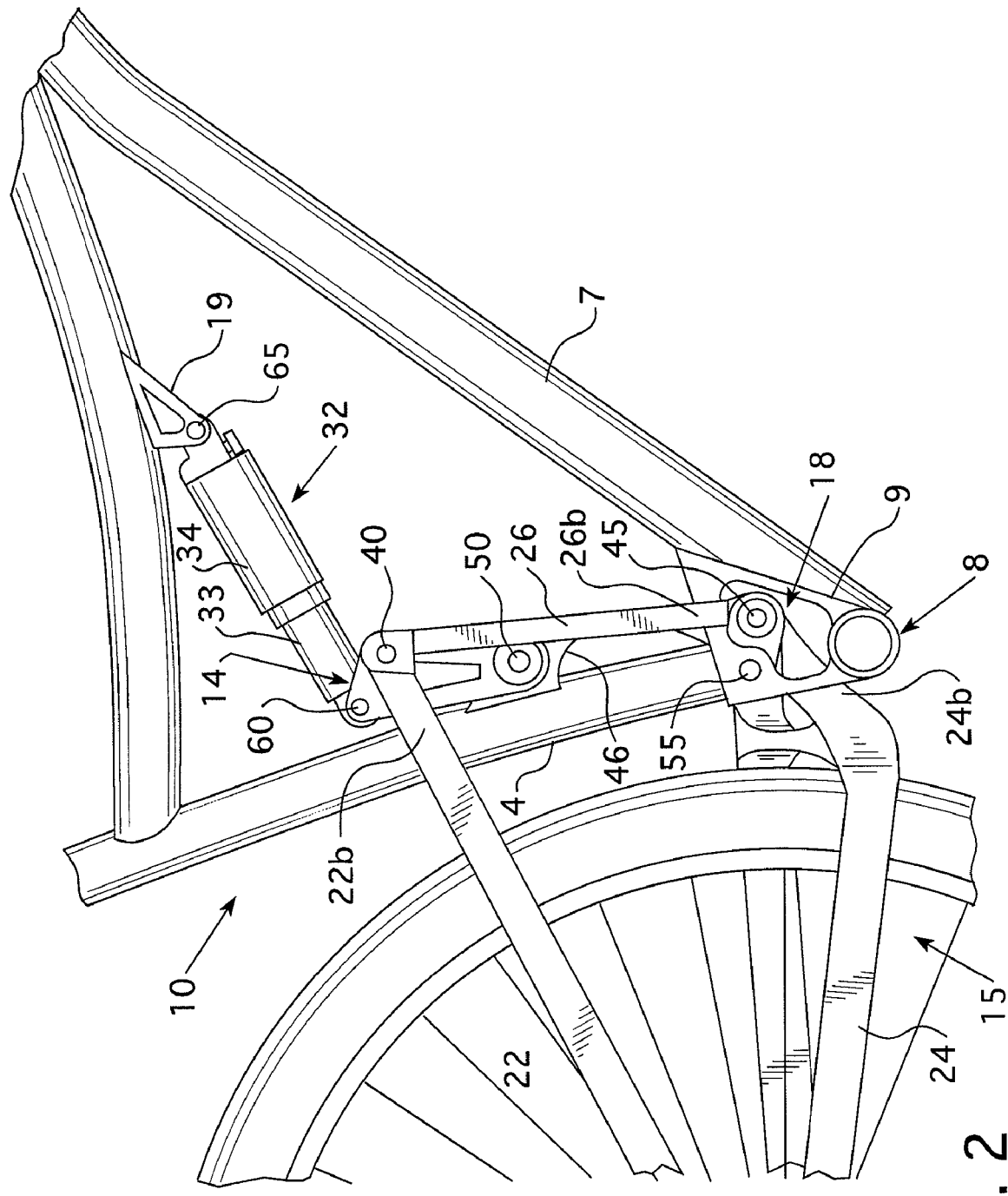
FIG. 2 is a diagram of the bike in FIG. 1 showing further details of the upper and lower linkages and the pivot members relating thereto.

FIG. 2 shows an enlarged depiction of lower linkage 18 and upper linkage 14. Lower linkage 18 is structured to include a housing 9, first lower pivot member 45, and second lower pivot member 55. As previously described herein, rear frame 15 is connected to lower linkage 18 such that the front portion 24b of lower arm 24 and the bottom portion 26b of vertical arm 26 are coupled to lower linkage 18 by pivot pin 45. Main frame 10 is connected to the housing 9 of lower linkage 18 by second lower pivot member 55. As shown in FIG. 2, first lower pivot member 45 is positioned forward of second lower pivot member 55.

In an embodiment, the housing 9 and bottom bracket 8 can be machined or cast as a single piece. The piece can be connected to the main frame by welding it to the seat tube 4 and diagonal tube 7.

As shown in FIG. 2, and as previously described, rear frame 15 is connected to upper linkage 14 such that the front portion 22b of swing arm 22 is coupled to upper linkage 14 by first upper pivot member 40. The main frame 10 is coupled to upper linkage 14 by second upper pivot member 50, which is coupled to flange 46 (which is, in turn, connected to seat tube 4). The rear portion of biasing member 32 is connected to upper linkage 14 by upper pin 60. The front portion of biasing member 32 is connected to top cross bar 5 of main frame 10 by connector 19. The front portion of biasing member 32 and the connector 19 are coupled by pin 65. The biasing member 32 includes a rod 33 and a cylinder 34. The rod 33 is structured to move inwardly and outwardly of the cylinder 34.

In a conventional manner, as with any rear suspension system and including the rear wheel suspension system of the present invention, the deflection of the rear wheel is limited by the stroke or compression (e.g., the maximum length of rod 33 that can move inwardly and outwardly of cylinder 34) of the biasing member.

In an embodiment, the biasing member can include a spring such as a coil spring or an air spring. In this embodiment, the deflection of the rear wheel is limited by the extension and compression of the spring.

Figure 3:
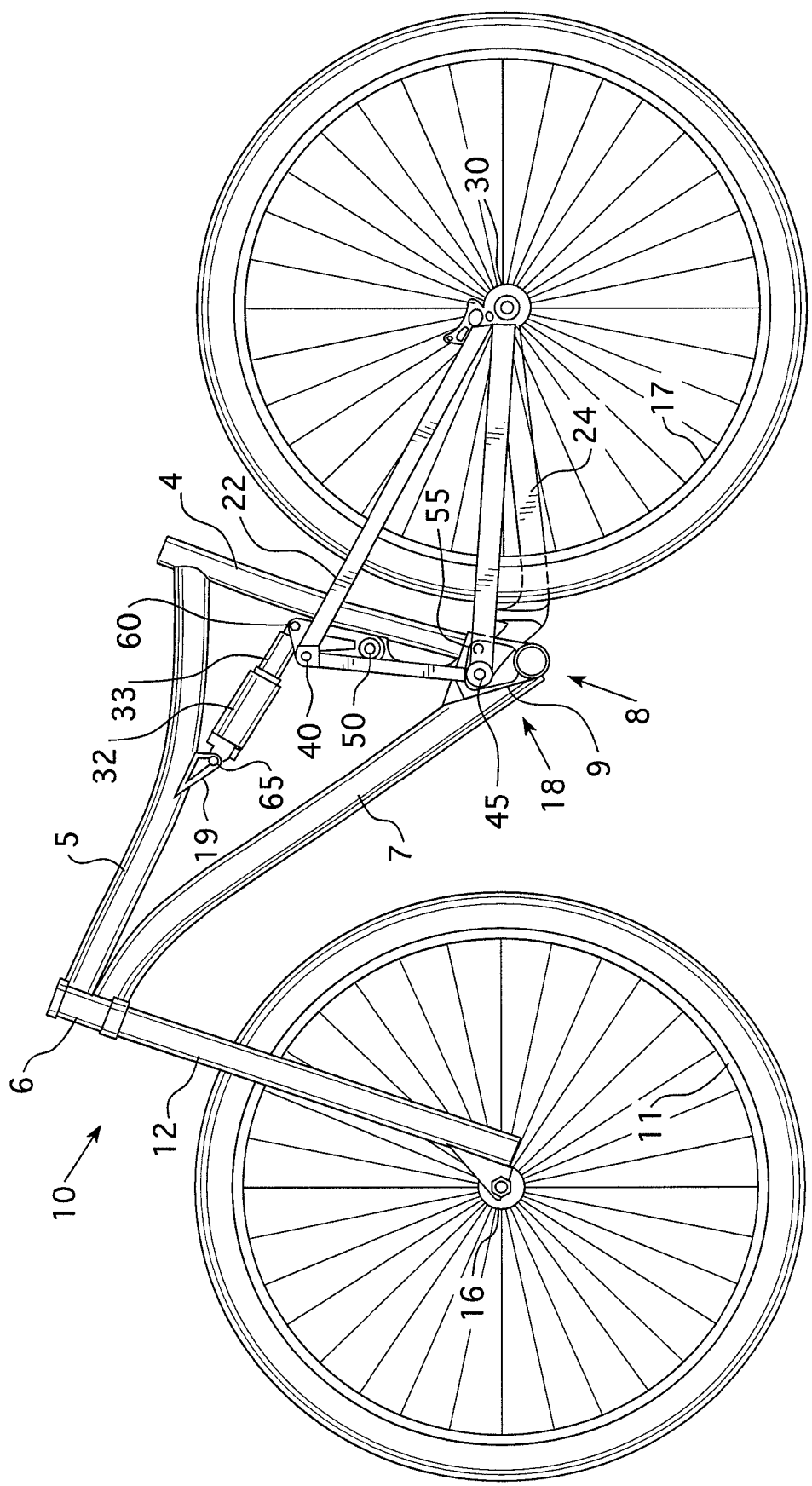
FIG. 3 is a diagram of the bike in FIG. 1 showing further detail of the pivot members when the biasing member is not compressed.

FIG. 3 shows an embodiment of the present invention wherein the biasing member is not compressed. As shown in FIG. 3, in the static position, e.g., when the two-wheeled vehicle is at rest without any load, the rod 33 of biasing member 32 is extended to its maximum length outside of cylinder 34. In this disposition, the rod 33 moves in a direction substantially in line (i.e., parallel) with the swing arm 22 of the rear frame 15. Further, rod 33 moves in a direction substantially perpendicular to vertical arm 26 or the vertical axis passing through the first upper pivot member and the first lower pivot member.

In other embodiments, the biasing member can be positioned in a variety of locations thereon the two-wheeled vehicle. For example, the biasing member may be positioned vertically forward of the seat tube 4.

When the two-wheeled vehicle is in a loaded static state (e.g., being used on flat ground without bumps or irregularities and carrying the weight of an average user), the rod 33 of biasing member 32 can be shortened by a small amount (not shown) such that rod 33 is not fully compressed or uncompressed. This loaded static state is referred to in the art as "sag" and it is generally presumed that the actuation of the suspension system starts from this already slightly compressed state.

Figure 4:
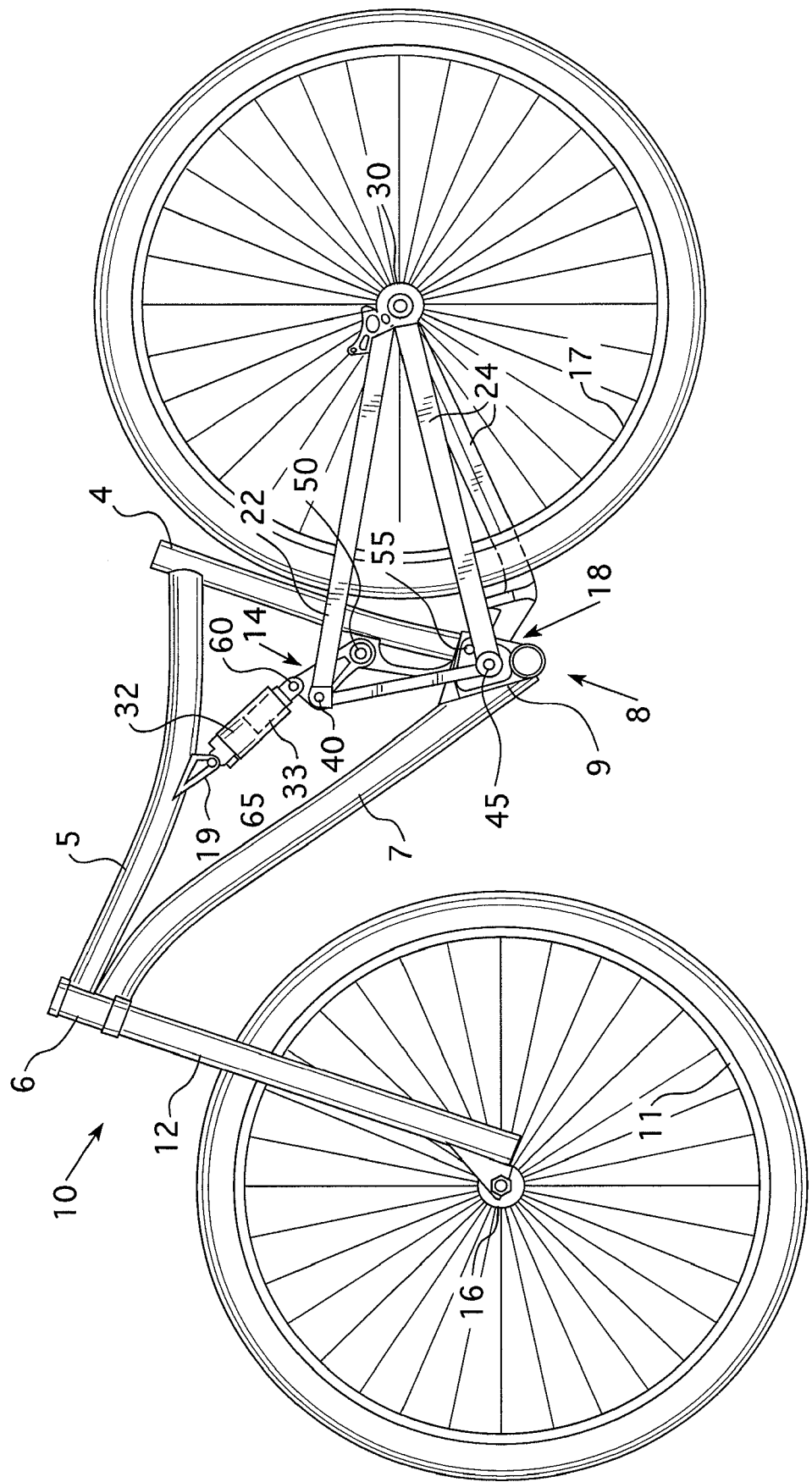
FIG. 4 is a diagram of the bike of FIG. 1 showing further detail of the pivot members when the biasing member is fully compressed.

FIG. 4 shows an embodiment of the present invention wherein the biasing member 32 is fully compressed. The configuration shown in FIG. 4 corresponds to the maximum deflection state wherein rod 33 is fully engaged in cylinder 34 of biasing member 32. As a result of this disposition, the upper linkage 14 moves forward in accordance with the movement of rod 33 (as shown in FIGS. 3 to 4) such that the first upper pivot member 40 is forward of the first lower pivot member 45 (as shown in FIG. 4). Also shown in FIGS. 3 to 4, first lower pivot member 45 is in a position substantially vertical relative to its starting position. In an embodiment, the first lower pivot member 45 is substantially vertically aligned above the bottom bracket 8. However, it is understood that in alternate embodiments, the first lower pivot member 45 may be in various positions such as but not limited to 45 degrees relative to its starting position instead of substantially vertical relative to its starting position or the bottom bracket 8.

The rear wheel suspension system of the present invention is structured to control the motion of the rear wheel of a two-wheeled vehicle and to dampen shocks due to deflection of the rear wheel in response to a force applied to the rear wheel by irregularities of a surface upon which the two-wheeled vehicle moves.

The rear wheel suspension system includes a rear frame that may resemble a triangle or any other suitable shape. The rear frame is pivotally connected to the main frame by an upper linkage and a lower linkage. The rear frame is also connected to a rear wheel. A biasing member is provided and is structured to move in response to a force applied to the rear wheel. The biasing member can be positioned in a wide variety of locations on the rear frame or main frame of the two-wheeled vehicle. In an embodiment, the biasing member is connected to at least two members selected from the main frame, the rear frame, the upper linkage and the lower linkage. For example, the biasing member can be connected to the main frame and upper linkage, or the rear frame and lower linkage, or the upper and/or lower linkages. In the embodiment wherein the biasing member is coupled to the main frame and the upper linkage, the compression of the biasing member in response to a force applied to the rear wheel, causes both the upper linkage and lower linkage to move in the same direction, i.e., forward.

As shown in FIGS. 1-4, upper pin 60 of biasing member 32 can be connected (e.g., pivotally) to swing arm 22 of rear frame 15.

Figure 5:
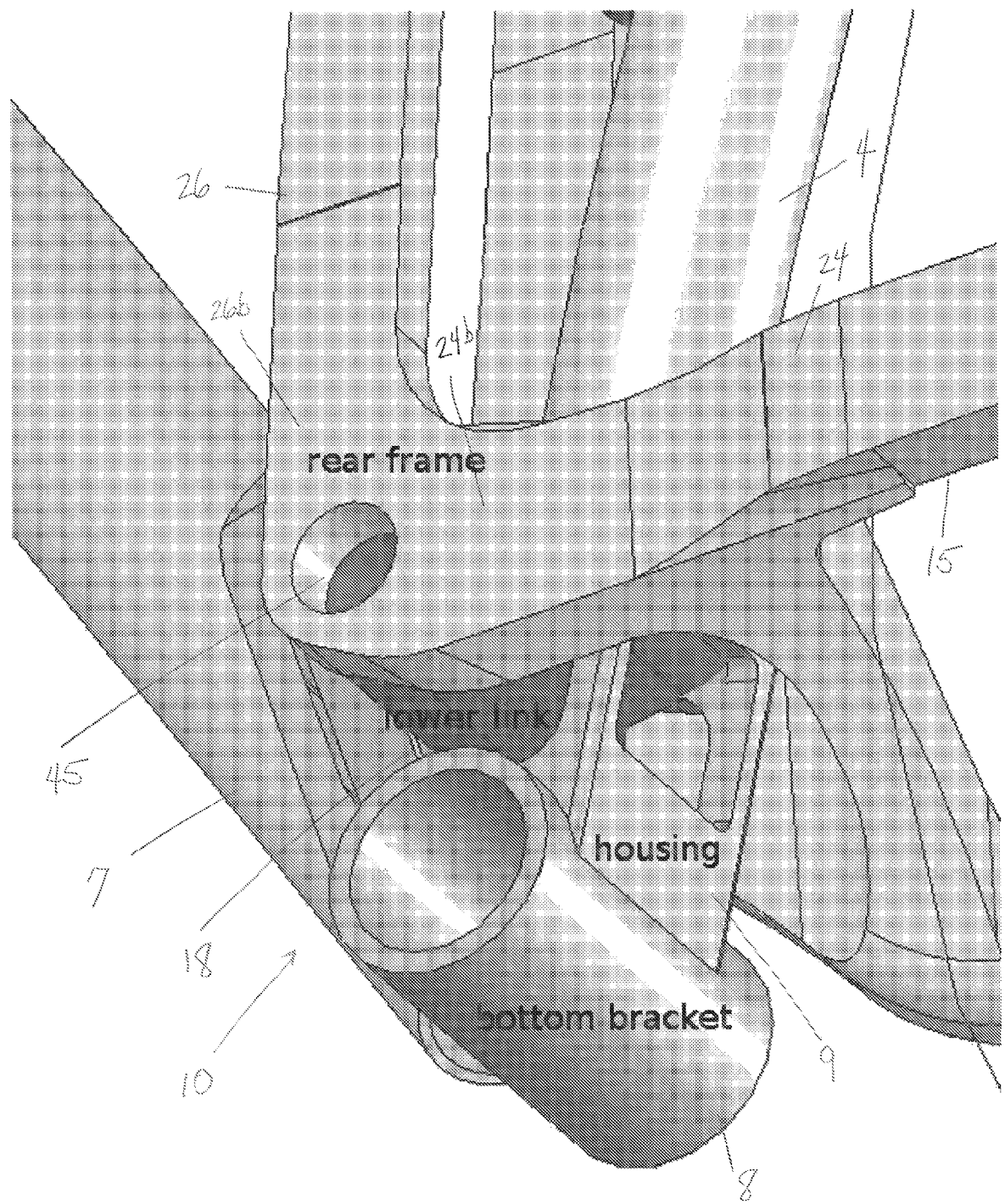
FIGS. 5 and 6 are diagrams of the bike of FIG. 1 showing further detail of the lower linkage, housing, bottom bracket and pivot members relating thereto.
Figure 6:
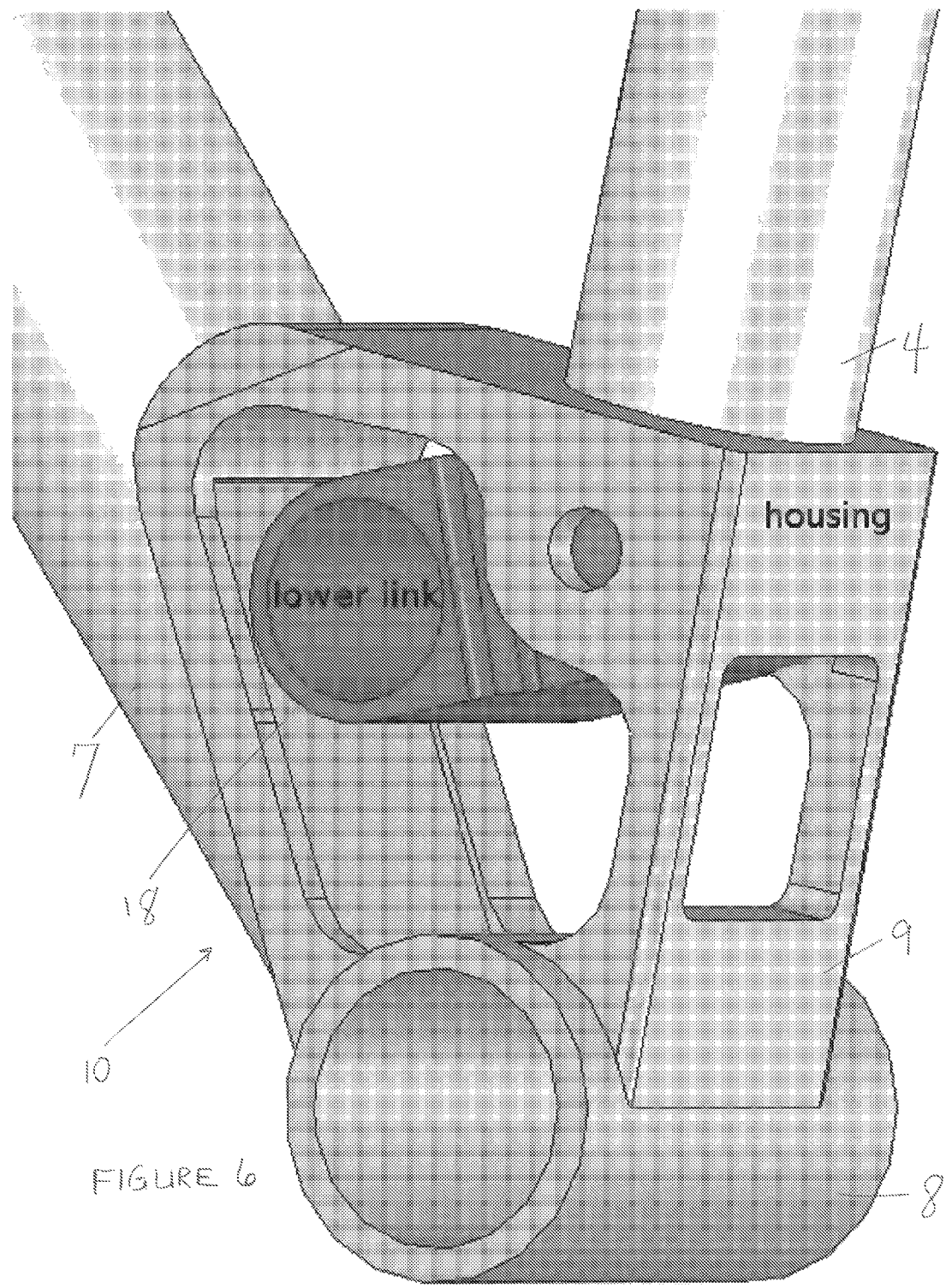

FIGS. 5 and 6 show an enlarged depiction of rear frame 15, first lower pivot member 45, lower linkage 18, housing 9, and bottom bracket 8 (as shown in FIG. 1). As previously described herein and shown in FIG. 5, the rear frame 15 is connected to lower linkage 18 such that the front portion of 24b of lower arm 24 and the bottom portion 26b of vertical arm 26 are coupled to lower linkage 18 by first lower pivot member 45. As shown in FIGS. 5 and 6, the housing 9 is connected to the bottom bracket 8 which are connected to the main frame 10 where the seat tube 4 intersects diagonal tube 7.

Figure 7:
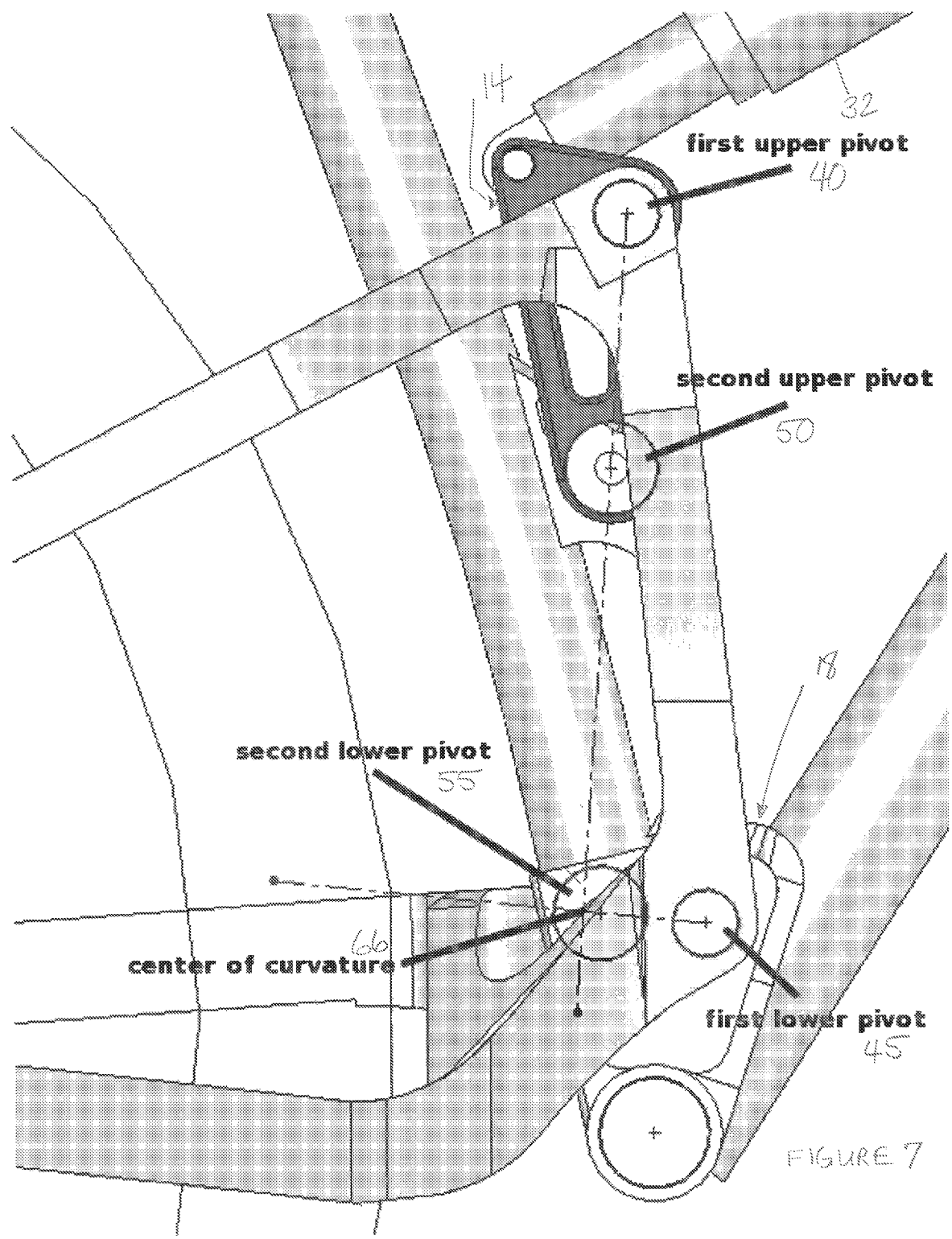
FIG. 7 is a diagram of the bike of FIG. 2 showing further detail of the instant center and pivot members relating thereto when the biasing member is not compressed.
Figure 8:
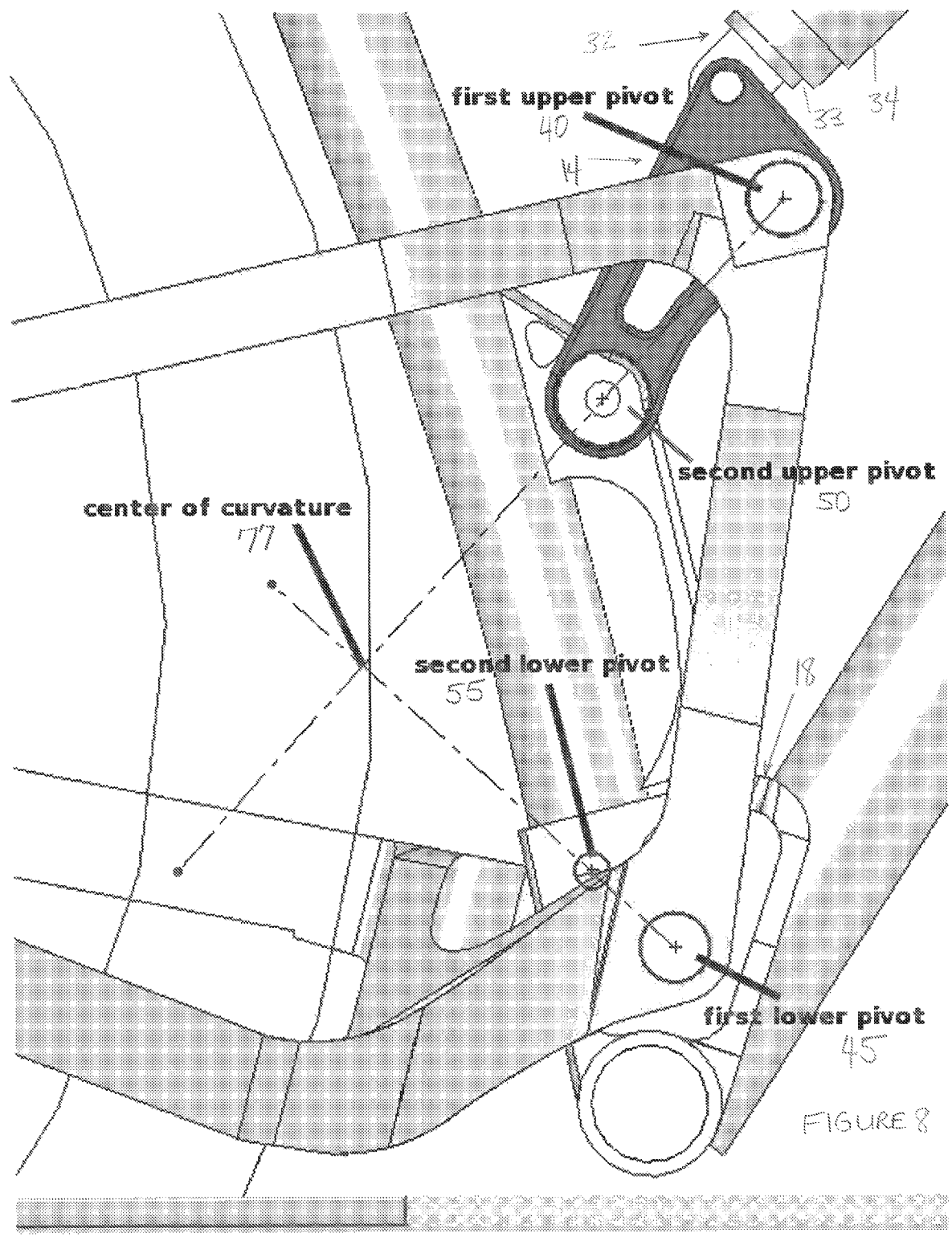
FIG. 8 is a diagram of the bike of FIG. 2 showing further detail of the instant center and pivot members relating thereto when the biasing member is compressed.

FIG. 7 shows and enlarged depiction of the upper linkage 14 and lower linkage 18 (as shown in FIG. 2) and the instant center 66 relating thereto when the biasing member 32 is not compressed. As shown in FIG. 7, a line projected rearward through pivot connections 40 and 50 of the upper linkage 14 and pivot connections 45 and 55 of the lower linkage 18 defines an instant center 66 of the rear axle path. The instant center 66 of the rear axle path is defined by the position of the linkages 40, 45, 50, 55 relative to one another. While the invention allows for variation in specific rear axle path, an aspect of the invention provides for vertical movement of the rear axle (i.e., relative to its starting position) along a vertical axis that passes through the rear axle of the rear wheel. Such a vertical wheel movement creates a corresponding change in the biasing member 32. For example, in an embodiment wherein the biasing member 32 is a shock absorber, the length of the shock absorber changes as the shock absorber piston arm (e.g., rod) moves inwardly or outwardly of a cylinder in response to the vertical motion of the rear wheel. FIG. 8 shows and enlarged depiction of the upper linkage 14 and lower linkage 18 (as shown in FIG. 2) and the instant center 77 relating thereto when the biasing member 32 is compressed. As shown in FIG. 8, vertical movement of the rear axle (i.e., relative to its starting position) along a vertical axis that passes through the rear axle of the rear wheel creates a change in the biasing member 32, i.e., it is compressed. The length of the biasing member changes as the rod 33 moves inwardly of a cylinder 34 in response to the vertical motion of the rear wheel. Further, as shown in FIG. 8, the instant center 77 moves rearward and upward.

A line projected rearward through one of the pivot connections of each of the upper linkage and the lower linkage defines an instant center of the rear axle path. The instant center of the rear axle path is defined by the position of the linkages relative to one another. While the invention allows for variation in specific rear axle path, an aspect of the invention provides for vertical movement of the rear axle (i.e., relative to its starting position) along a vertical axis that passes through the rear axle of the rear wheel. Such a vertical wheel movement creates a corresponding change in the biasing member. For example, in an embodiment wherein the biasing member is a shock absorber, the length of the shock absorber changes as the shock absorber piston arm (e.g. rod) moves inwardly or outwardly of a cylinder in response to the vertical motion of the rear wheel.

In the present invention, the position of the linkages and the rear frame to the main frame is structured to allow for substantially vertical movement of a rear axle along a vertical axis that passes through the rear axle of the wheel. The instant center, about which the rear axle pivots throughout its range of motion, is positioned rearward and above the center of rotation of the gear (e.g. bottom bracket) being driven by the pedaling motion of a rider.

In an aspect of the present invention, the instant center of the rear axle path is defined by the position of the linkages and pivots such that, as the biasing member is compressed and the linkages move forward in response to a force applied on the rear wheel, the instant center of the rear axle path moves from a position proximate to a rear pivot of the lower linkage to a position proximate to above and behind the rear pivot location.

Figure 9:
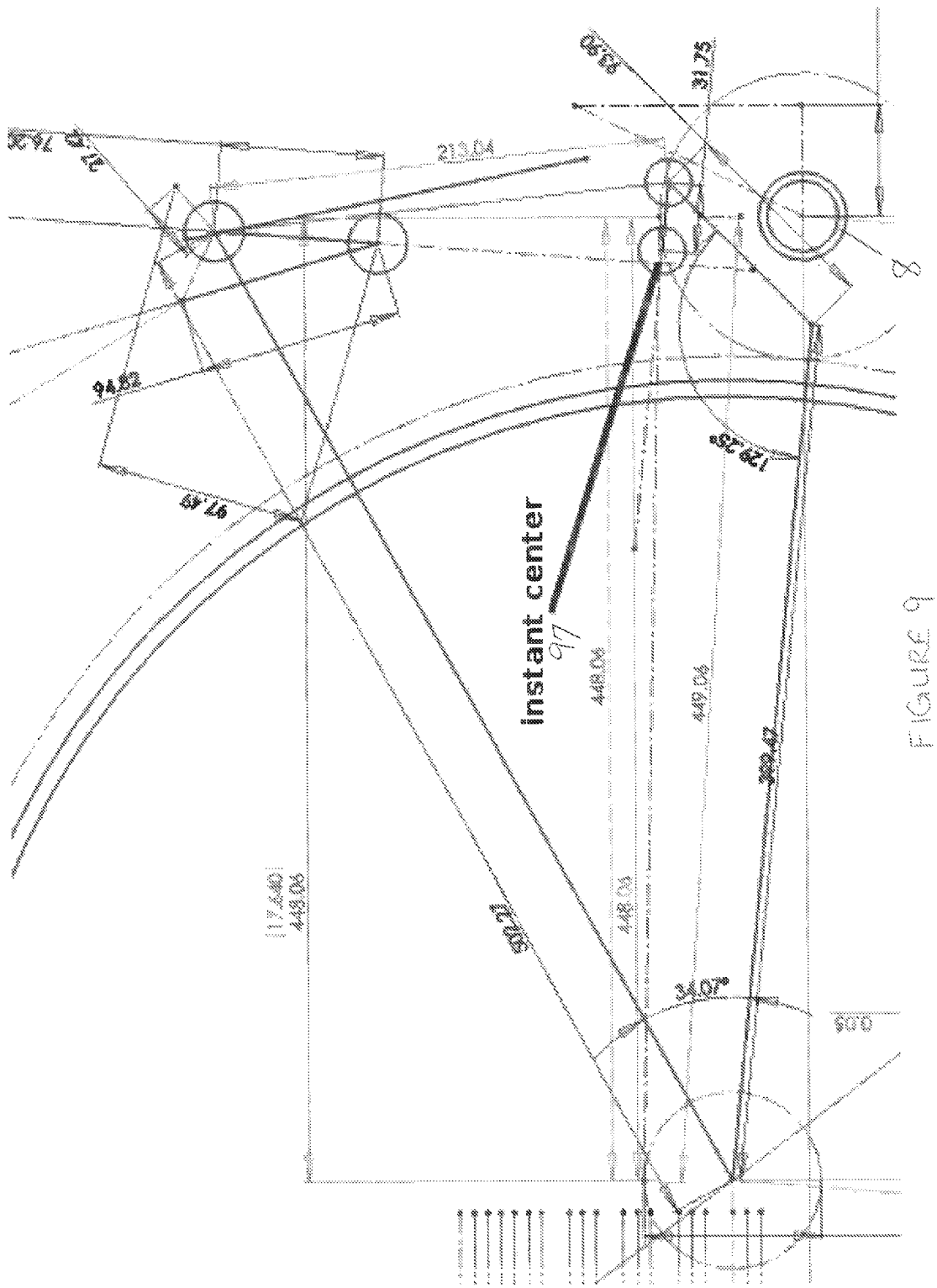
FIG. 9 is a diagram of the bike of FIG. 2 showing further detail of the instant center and pivot members relating thereto when the biasing member is not compressed.
Figure 10:
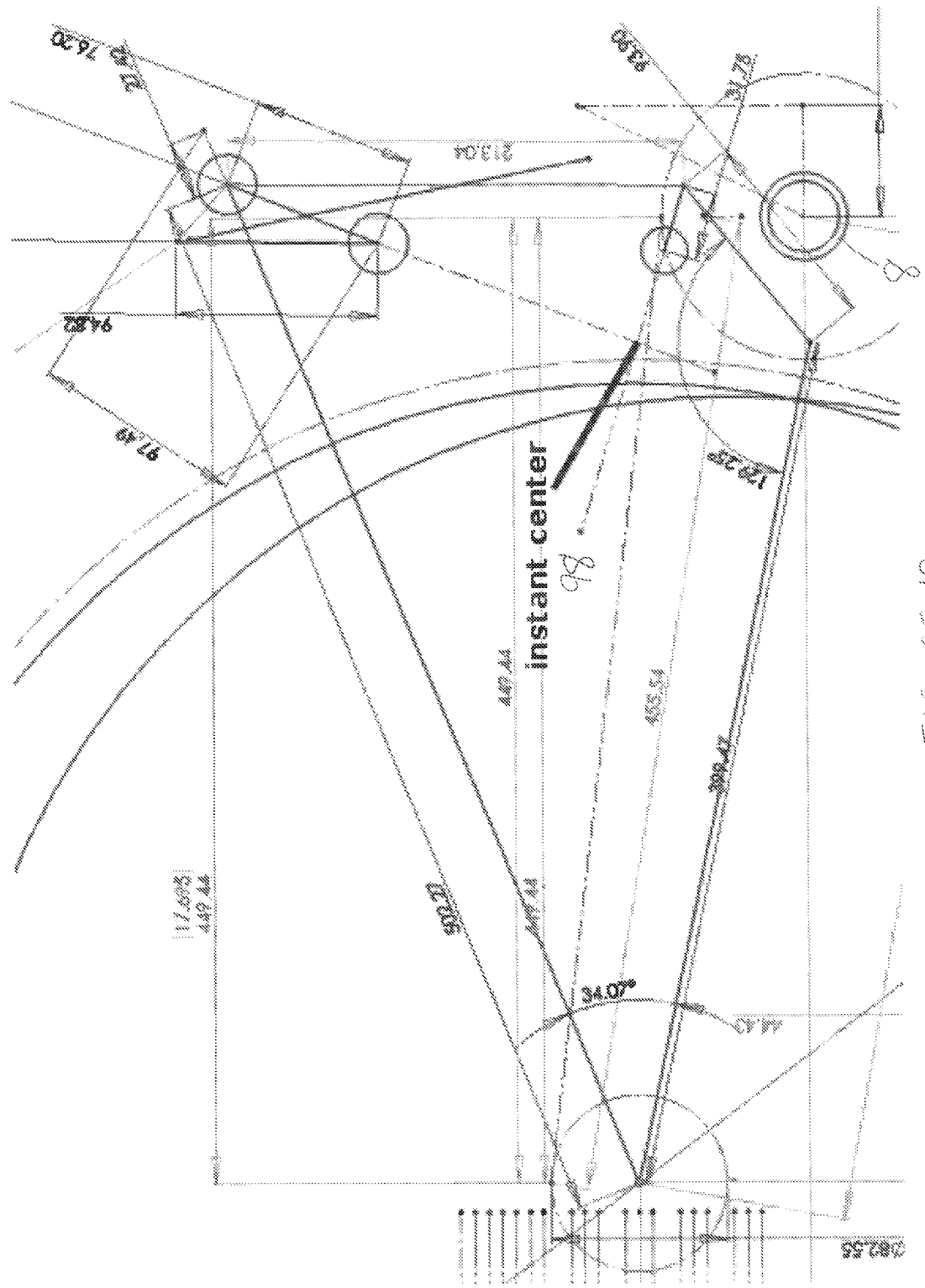
FIG. 10 is a diagram of the bike of FIG. 2 showing further detail of the instant center and pivot members relating thereto when the biasing member is partially compressed.
Figure 11:
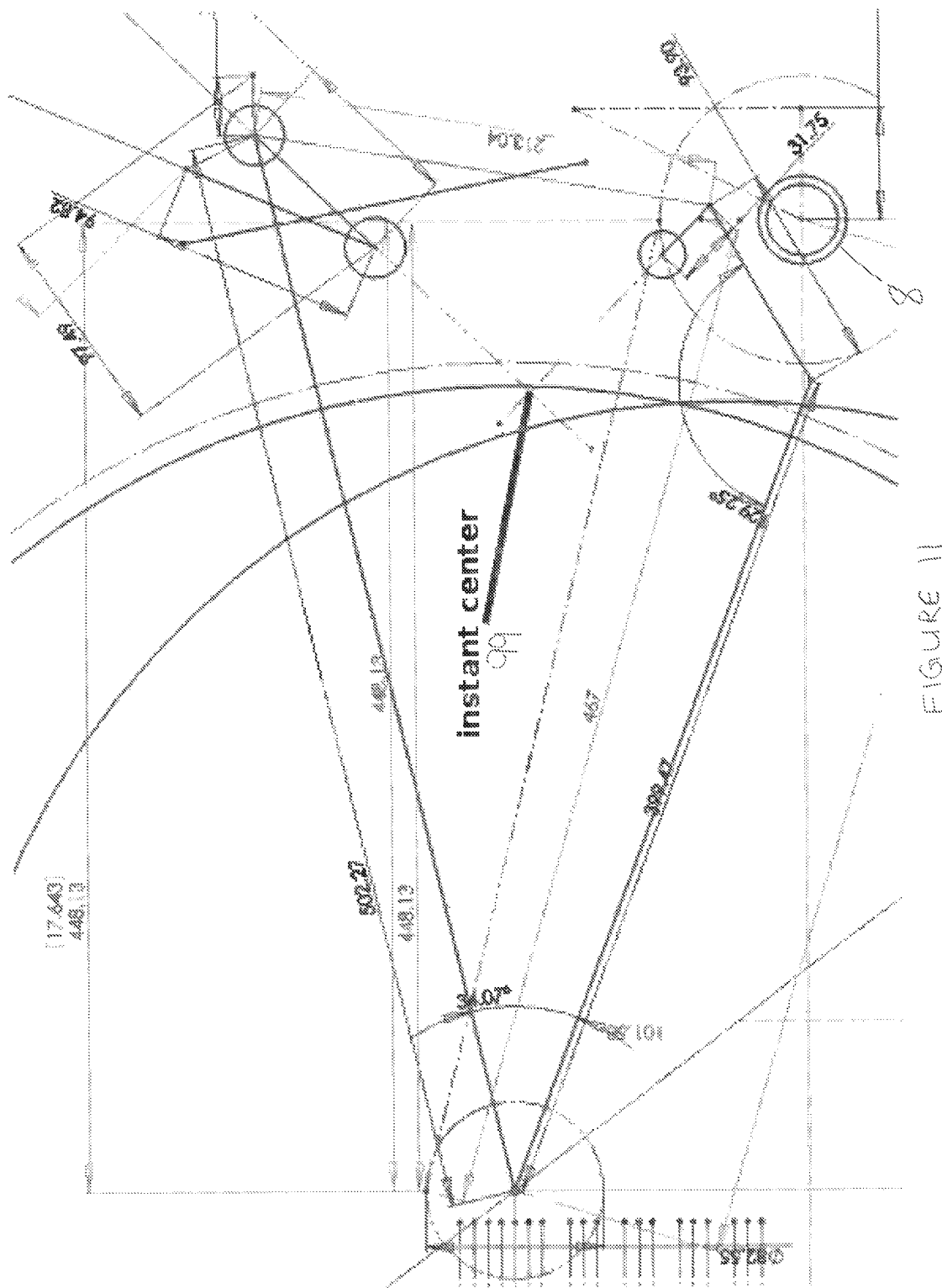
FIG. 11 is a diagram of the bike of FIG. 2 showing further detail of the instant center and pivot members relating thereto when the biasing member is fully compressed.

In an aspect of the present invention, as shown in FIG. 9, the instant center 97 of the rear axle path originates in an area behind and above the bottom bracket 8 of the bicycle that contains the lower linkage and moves rearward and upward as shown by the instant center 98 in FIG. 10 wherein as an axle coupled to the rear wheel moves substantially vertically along the vertical axis that passes through the axle in response to the force applied to the rear wheel wherein the biasing member 32 is partially compressed and then, as shown in FIG. 11, the instant center 99 moves further rearward and upward and the biasing member 32 is fully compressed. There can be both a pedaling force and a bump force (e.g., force resulting from impact with obstacle or irregularity in terrain surface) applied to the rear wheel.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended hereto and any and all equivalents thereof.

What is claimed is:

1. A rear wheel suspension system for a two-wheeled vehicle which comprises a main frame, the suspension system comprising:

a rear frame pivotally connected to an upper linkage and a lower linkage, said rear frame being connected to said lower linkage by a first lower pivot member and said rear frame being pivotally connected to said upper linkage by a first upper pivot member;

a rear wheel coupled to said rear frame;

a bottom bracket mounted to said main frame, said bottom bracket being structured to house a pedal assembly; and a biasing member connected to at least said main frame and said upper linkage, the biasing member structured to be compressed in response to a force applied to said rear wheel, wherein said main frame is connected to a housing of said lower linkage by a second lower pivot member, and wherein said first lower pivot member being positioned forward of said second lower pivot member, wherein said main frame is pivotally connected to said upper linkage by a second upper pivot member, said first upper pivot member being positioned forward of said second upper pivot member, and wherein said biasing member is pivotally connected to said upper linkage by a third upper pivot member.

2. The rear wheel suspension system of claim 1, wherein said upper linkage and said lower linkage are structured to move in the same direction in response to compression of said biasing member.

3. The rear wheel suspension system of claim 2 wherein said direction is forward.

4. The rear wheel suspension system of claim 1 wherein said biasing member is selected from a group consisting essentially of a spring, shock absorber or combination thereof.

5. The rear wheel suspension system of claim 4 wherein said biasing member is a shock absorber comprising a rod and a cylinder.

6. The rear wheel suspension system of claim 4 wherein said biasing member is selected from the group consisting of a compression spring and an air spring.

7. The rear wheel suspension system of claim 5 wherein said biasing member being non-compressed, said rod is extended to essentially its maximum length.

8. The rear wheel suspension system of claim 5 wherein said biasing member being essentially fully compressed said rod is essentially maximally engaged within the cylinder.

9. The rear wheel suspension system of claim 1, wherein said rear wheel has an axle, wherein the axle has a vertical axis that passes therethrough, and wherein said rear frame, said upper linkage and said lower linkage are structured to allow for substantially vertical movement of the axle along the vertical axis.

10. The rear wheel suspension system of claim 1, wherein a line projected rearward through at least one of the pivot connections of each of the upper linkage and the lower linkage defines an instant center of a rear axle path, wherein responsive to compression of the biasing member the upper linkage and the lower linkage move in the same direction and the instant center of the rear axle path moves from a position proximate to a rear pivot location of the lower linkage to a position proximate to above and behind the bottom bracket.

11. The rear wheel suspension system of claim 1, wherein a line projected rearward through one of the pivot connections of each of the upper linkage and the lower linkage defines an instant center of a rear axle path, wherein the instant center of the rear axle path originates in an area behind and above a bottom bracket assembly that contains the lower linkage and moves rearward and upward as an axle coupled to the rear wheel moves substantially vertically along a vertical axis the passes through the axle in response to the force applied to the rear wheel.

12. A two-wheeled vehicle including a rear wheel suspension system comprising:

a rear frame comprising a swing arm, a lower arm and a vertical arm, the rear frame pivotally connected to an upper linkage and a lower linkage, said rear frame being connected to said lower linkage by a first lower pivot member and said rear frame being pivotally connected to said upper linkage by a first upper pivot member;

a rear wheel coupled to said rear frame;

a bottom bracket mounted to said main frame, said bottom bracket being structured to house a pedal assembly; and a biasing member connected to at least said main frame and said upper linkage, the biasing member structured to be compressed in response to a force applied to said rear wheel, wherein said main frame is connected to a housing of said lower linkage by a second lower pivot member, and wherein said first lower pivot member being positioned forward of said second lower pivot member, wherein said main frame is pivotally connected to said upper linkage by a second upper pivot member, said first upper pivot member being positioned forward of said second upper pivot member, and wherein said biasing member is pivotally connected to said upper linkage by a third upper pivot member.

13. The two-wheeled vehicle of claim 12 wherein said vehicle is selected from the group consisting of a bicycle and a mountain bike.

14. A rear wheel suspension system for a two-wheeled vehicle which comprises a main frame, the suspension system comprising:

a rear frame pivotally connected to an upper linkage and a lower linkage, said rear frame being connected to said lower linkage by a first lower pivot member;

a rear wheel coupled to said rear frame; and a biasing member being a shock absorber comprising a rod and a cylinder, connected to at least two members selected from the group consisting of said main frame, said rear frame, said upper linkage and said lower linkage, the biasing member structured to be compressed in response to a force applied to said rear wheel, and wherein said biasing member being non-compressed, said rod is extended to essentially its maximum length, wherein said main frame is pivotally connected to said lower linkage by a second lower pivot member, and wherein said first lower pivot member being positioned forward of said second lower pivot member.

15. A rear wheel suspension system for a two-wheeled vehicle which comprises a main frame, the suspension system comprising:

a rear frame pivotally connected to an upper linkage and a lower linkage, said rear frame being connected to said lower linkage by a first lower pivot member;

a rear wheel coupled to said rear frame; and a biasing member being a shock absorber comprising a rod and a cylinder, connected to at least two members selected from the group consisting of said main frame, said rear frame, said upper linkage and said lower linkage, the biasing member structured to be compressed in response to a force applied to said rear wheel, and wherein said biasing member being essentially fully compressed said rod is essentially maximally engaged within the cylinder, wherein said main frame is pivotally connected to said lower linkage by a second lower pivot member, and wherein said first lower pivot member being positioned forward of said second lower pivot member.

16. A rear wheel suspension system for a two-wheeled vehicle which comprises a main frame, the suspension system comprising:
- a rear frame pivotally connected to an upper linkage and a lower linkage, said rear frame being connected to said lower linkage by a first lower pivot member;
- a rear wheel coupled to said rear frame; and
- a biasing member connected to at least two members selected from the group consisting of said main frame, said rear frame, said upper linkage and said lower linkage, the biasing member structured to be compressed in response to a force applied to said rear wheel, wherein said main frame is pivotally connected to said lower linkage by a second lower pivot member, and wherein said first lower pivot member being positioned forward of said second lower pivot member, wherein a line projected rearward through one of the pivot connections of each of the upper linkage and the lower linkage defines an instant center of a rear axle path, and wherein the instant center of the rear axle path originates in an area behind and above a bottom bracket assembly that contains the lower linkage and moves rearward and upward as an axle coupled to the rear wheel moves substantially vertically along a vertical axis that passes through the axle in response to the force applied to the rear wheel.

* * * * *